United States Patent
Takahara

Patent Number: 6,068,564
Date of Patent: May 30, 2000

[54] CONTINUOUSLY VARIABLE TRANSMISSION WITH BELT-DRIVEN PULLEY SYSTEM

[75] Inventor: Hideaki Takahara, Kanagawa, Japan

[73] Assignee: Nissan Motor Co., Ltd., Yokohama, Japan

[21] Appl. No.: 09/106,311

[22] Filed: Jun. 29, 1998

[30] Foreign Application Priority Data

Jun. 30, 1997 [JP] Japan ................................. 9-174903

[51] Int. Cl.⁷ .......................... F16H 59/00; F16H 55/36
[52] U.S. Cl. ........................................ 474/12; 474/175
[58] Field of Search .................................. 474/8, 12, 18, 474/28, 168, 174, 175, 177, 179, 180, 181, 184, 190

[56] References Cited

U.S. PATENT DOCUMENTS

| | | | |
|---|---|---|---|
| 955,227 | 4/1910 | Tunis ........................................ | 474/177 |
| 2,187,188 | 1/1940 | Whitcomb ................................. | 474/8 |
| 2,892,354 | 6/1959 | Amonsen ................................... | 474/8 |
| 3,788,155 | 1/1974 | Cigala et al. ............................. | 474/177 |
| 4,227,423 | 10/1980 | Crowe ....................................... | 474/177 |
| 4,292,723 | 10/1981 | Rauscher ................................... | 474/177 |
| 4,367,067 | 1/1983 | Chao ......................................... | 474/175 |
| 4,781,660 | 11/1988 | Amataka et al. ......................... | 474/174 |
| 4,905,361 | 3/1990 | Morishita et al. ......................... | 29/892 |
| 4,947,533 | 8/1990 | Taniguchi et al. ......................... | 474/8 |
| 5,403,240 | 4/1995 | Smith et al. ............................... | 474/8 |
| 5,725,446 | 3/1998 | Kaku et al. ................................ | 474/8 |

FOREIGN PATENT DOCUMENTS 1 520 244 8/1978 United Kingdom .
1 523 431 8/1978 United Kingdom .

OTHER PUBLICATIONS

Japanese Industrial Standard; "Surface Roughness—Definitions and Designation"; 1994.

*Primary Examiner*—Tamara L. Graysay
*Assistant Examiner*—Matthew A. Kaness
*Attorney, Agent, or Firm*—Foley & Lardner

[57] ABSTRACT

A continuously variable transmission of an automotive vehicle comprises a primary pulley disposed on a power input shaft, and a secondary pulley disposed on a power output shaft. Each of the primary and secondary pulleys includes a fixed wheel counterpart having a first sheave surface, and a movable wheel counterpart having a second sheave surface. The first and second sheave surfaces face each other to form a pulley groove whose width is changeable with axial movement of the movable wheel counterpart. An endless belt is wound on the primary pulley and the secondary pulley so that the secondary pulley is drivably connected to the primary pulley. The belt includes a steel belt portion, and a plurality of steel elements supported on the steel belt portion and aligned along the steel belt portion. The respective steel elements are engageable in the pulley grooves of the primary pulley and the secondary pulley. In the above arranged continuously variable transmission, the sheave surfaces of the fixed and movable wheel counterparts of the primary pulley has a first surface roughness, and the sheave surfaces of the fixed and movable wheel counterparts of the secondary pulley has a second surface roughness which is rougher than the first surface roughness.

5 Claims, 3 Drawing Sheets

CONTINUOUSLY VARIABLE TRANSMISSION WITH BELT-DRIVEN PULLEY SYSTEM

The contents of Japanese Patent Application No. 9-174903, with a filing date of Jun. 30, 1997 in Japan, are hereby incorporated by reference.

BACKGROUND OF THE INVENTION

1. Field of the Invention

This invention relates to improvements in a continuously variable transmission of the type wherein a belt is passed on primary and secondary pulleys to transmit engine power from the primary pulley to the secondary pulley.

2. Description of the Prior Art

Conventional continuously variable transmission (CVT) of the type using a belt includes a primary pulley and a secondary pulley. An endless or loop-shaped belt is wound or passed on the primary and secondary pulleys. Each of the primary and secondary pulleys includes an axially fixed wheel counterpart and an axially movable wheel counterpart which are rotatable around a common axis. The fixed and movable wheel counterparts are respectively formed with generally frustoconical sheave surfaces which face each other to form a generally V-shaped pulley groove. Here, the primary and secondary pulleys are usually the same in surface roughness of the sheave surfaces of the fixed and movable wheel counterparts. The belt includes an endless steel belt portion or cylindrical ring. A plurality of plate-shaped steel elements are supported on the belt portion in a manner to be aligned along the periphery of the belt portion so that the adjacent ones are contactable with each other. The respective steel elements are engaged in the generally V-shaped grooves of the primary and secondary pulleys. Power is transmitted from the primary pulley to the secondary pulley under pushing force between the adjacent steel elements.

However, drawbacks have been encountered in the above-discussed conventional continuously variable transmission. There is the possibility of relative sliding occurring between the steel elements engaged in the V-shaped groove and the sheave surfaces in the primary pulley. In case that the surface roughness of the sheave surfaces of the primary and secondary pulleys is higher (i.e., to make the sheave surfaces relatively rough), damage such as wear or breakaway of the surface portion tends to occur in the sheave surfaces when the relative slip is made between the steel elements and the sheave surface on the side of the primary pulley. This is problematic from the viewpoints of the durability of the primary pulley. On the contrary, in case that the surface roughness of the sheave surfaces of the primary and secondary pulleys is lower (i.e., to make the sheave surfaces relatively smooth), unnecessary processing such as grinding has been made also onto the side of the secondary pulley even though relative sliding does not occur between the steel elements and the sheave surfaces on the secondary pulley. This will shorten life of the grinder so as to be problematic from the viewpoint of production cost.

BRIEF SUMMARY OF THE INVENTION

It is an object of the present invention to provide an improved continuously variable transmission of the type using a belt, which can effectively overcome drawbacks encountered in conventional continuously variable transmissions of the belt using type.

Another object of the present invention is to provide an improved continuously variable transmission of the type using a belt, which can effectively maintain its durability even if relative sliding occurs between the belt and a primary pulley while lowing in production cost of the transmission.

A continuously variable transmission of the present invention comprises a primary pulley disposed on a power input shaft. The primary pulley includes a fixed wheel counterpart which is fixed to the power input shaft and has a first sheave surface coaxial with the power input shaft, and a movable wheel counterpart which is movable in a direction of axis of the power input shaft and has a second sheave surface coaxial with the power input shaft. The second sheave surface faces the first sheave surface to form a first pulley groove whose width is changeable with movement of the movable wheel counterpart. A secondary pulley is disposed on a power output shaft and includes a fixed wheel counterpart which is fixed to the power output shaft and has a third sheave surface coaxial with the power output shaft, and a movable wheel counterpart which is movable in a direction of axis of the power output shaft and has a fourth sheave surface coaxial with the power output shaft. The fourth sheave surface faces the third sheave surface to form a second pulley groove whose width is changeable with movement of the movable pulley. An endless belt is wound on the primary pulley and the secondary pulley so that the secondary pulley is drivably connected to the primary pulley. An effective radius of the belt wound on each of the primary and secondary pulleys being changeable with a transmission ratio. The belt includes a steel belt portion, and a plurality of steel elements supported on the steel belt portion and aligned along the steel belt portion. Each steel element is engaged in the first pulley groove of the primary pulley and in the second pulley groove of the secondary pulley so as to be locatable between and contactable with the first and second sheave surfaces of the primary pulley and the third and fourth sheave surfaces of the secondary pulley. In the above arranged continuously variable transmission, the first and second sheave surfaces of the fixed and movable wheel counterparts of the primary pulley has a first surface roughness, and the third and fourth sheave surfaces of the fixed and movable wheel counterparts of the secondary pulley has a second surface roughness which is rougher than the first surface roughness.

With the above-arranged continuously variable transmission, when an automotive vehicle is suddenly accelerated from its low vehicle speed range by largely depressing an accelerator pedal, the continuously variable transmission is changed into its condition in which the transmission ratio is larger. At this time, the primary pulley rotates at a higher speed, while the secondary pulley rotates at a lower speed upon inertia (for stopping the vehicle body) of a vehicle body being applied to the secondary pulley. Consequently, the steel elements engaged in the V-shaped groove of the primary pulley are moved along the belt portion to the side of the secondary pulley thereby pushing the steel elements engaged in the V-shaped groove of the secondary pulley, in which the steel elements moved from the primary pulley are brought into contact with each other on the secondary pulley. As a result, there is the possibility that relative sliding tends to occur between the steel elements engaged in the V-shaped groove and the sheave surfaces in the primary pulley.

However, according to this continuously variable transmission, the sheave surfaces of the primary pulley are formed to have the relatively low surface roughness or to be relatively smooth, and therefore friction coefficient of the sheave surfaces of the primary pulley relative to the steel elements is relatively low even if the relative sliding occurs.

Consequently, there is no possibility of damage such as wear and breakaway of the surface portion occurring in the sheave surfaces of the primary pulley, thereby improving durability of the primary pulley. Additionally, since no sliding of the steel elements occurs at the sheave surfaces of the secondary pulley, there is no problem even if the sheave surfaces of the secondary pulley are formed to have either the relatively high surface roughness or the relatively low surface roughness. In other words, the upper limit of the range of the surface roughens of the secondary pulley is higher (rougher) than the surface roughness of the primary pulley. As a result, no high accuracy control is necessary for the surface roughness of the sheave surfaces of the secondary pulley. In this regard, in case that the sheave surfaces of the primary and secondary pulleys are formed by grinding with a grinder, life of the grinder can be prolonged while lowering production cost of the continuously variable transmission by keeping the sheave surfaces of the secondary pulley at a rough condition.

DETAILED DESCRIPTION OF THE INVENTION

Figure 2:
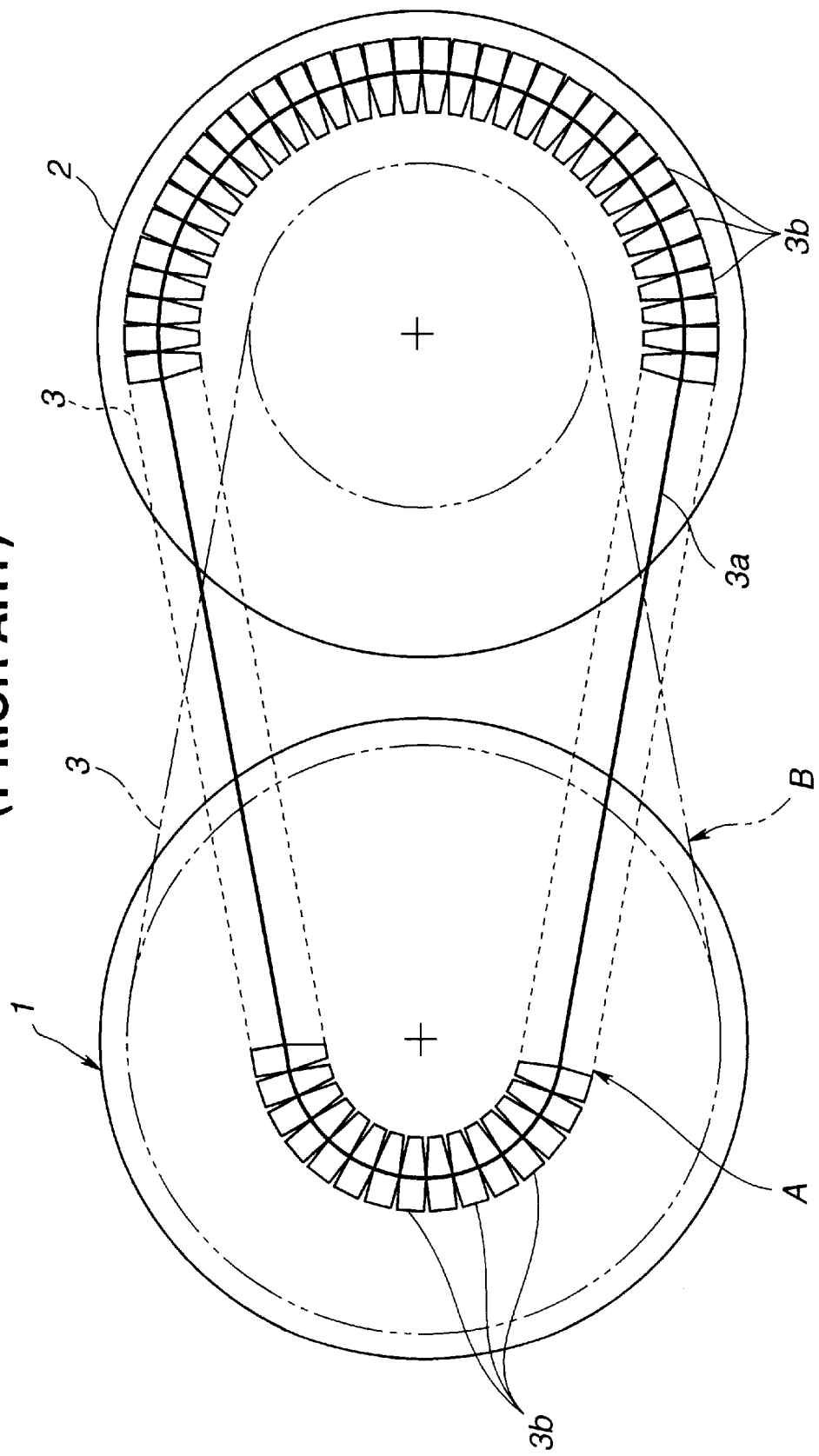
FIG. 2 is a schematic side view of an essential part of a conventional continuously variable transmission, in which a belt is passed on primary and secondary pulleys.
Figure 3:
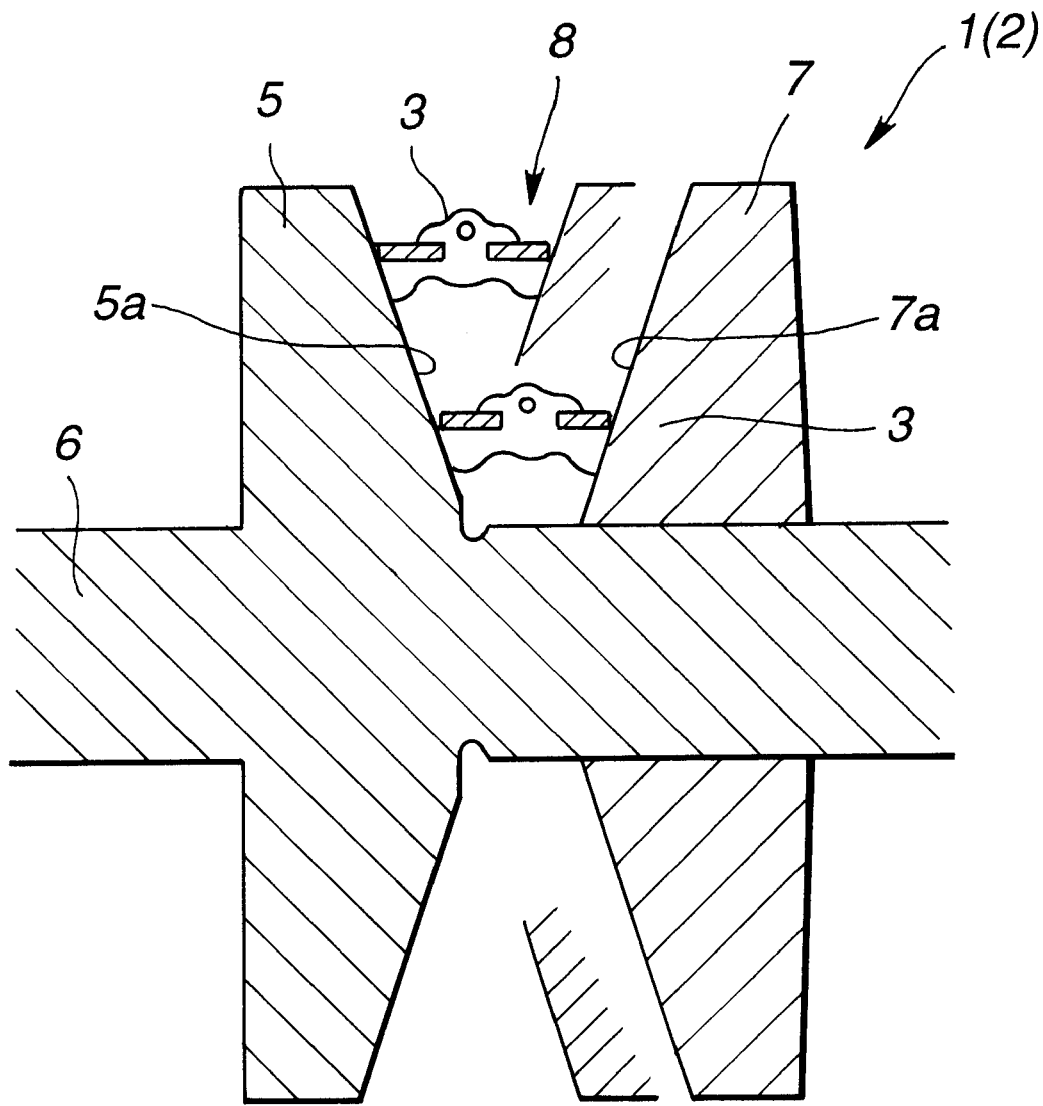
FIG. 3 is a fragmentary schematic sectional view showing a structure of each of the primary and secondary pulleys of FIG. 2.

To facilitate understanding of the present invention, a brief reference will be made to a conventional continuously variable transmission (CVT), depicted in FIGS. 2 and 3. Referring to FIGS. 2 and 3, the continuously variable transmission is shown including a primary pulley 1 to which power is input, and a secondary pulley 2 from which power is output. An endless or loop-shaped belt 3 is wound or passed on the primary and secondary pulleys 1, 2. As shown in FIG. 3, each of the primary and secondary pulleys 1, 2 includes an axially fixed wheel counterpart 5 and an axially movable wheel counterpart 7 which are rotatable around a common axis (not shown). The fixed and movable wheel counterparts 5, 7 are respectively formed with generally frustoconical sheave surfaces 5a, 7a which face each other to form a pulley groove 8 having a generally V-shaped cross-section. Here, the primary and secondary pulleys 1, 2 are the same in surface roughness of the sheave surfaces 5a, 7a of the fixed and movable wheel counterparts 5.

As shown in FIG. 2, the belt 3 includes an endless steel belt portion or cylindrical ring 3a which is formed by laminating a plurality of endless steel sheets. A plurality of plate-shaped steel elements 3b are supported on the belt portion 3a in a manner to be aligned along the periphery of the belt portion 3a so that the adjacent ones are contactable with each other. Each steel element 3b has two opposite inclined end faces (not identified) which are respectively formed at the axially opposite ends of the element 3b relative to the pulley. The opposite inclined end faces of each steel element 3b are to be brought into sidable contact with the frustoconical sheave surfaces of the wheel counterparts of the pulley, so that the steel elements 3b are engaged in the generally V-shaped grooves 8 of the primary and secondary pulleys 1, 2. Power is transmitted from the primary pulley 1 to the secondary pulley 2 under pushing force between the adjacent steel elements 3b.

When a transmission ratio (revolution speed of the primary pulley/revolution speed of the secondary pulley) is larger, the width of the V-shaped groove 8 of the primary pulley 1 is increased thereby decreasing an effective radius (a radius at which the belt 3 is passed or wound on the pulley) of the belt 3, while the width of the V-shaped groove 8 of the secondary pulley 2 is decreased thereby increasing the effective radius of the belt 3, so that the belt 3 takes a state as indicated by the character A in FIG. 2. When the transmission ratio is smaller, the width of the V-shaped groove 8 of the primary pulley 1 is decreased thereby increasing the effective radius of the belt 3, while the width of the V-shaped groove 8 of the secondary pulley 2 is increased thereby decreasing the effective radius of the belt 3, so that the belt 3 takes a state as indicated by the character B in FIG. 2.

However, drawbacks have been encountered in the above-discussed conventional continuously variable transmission, as set forth below. For example, when an automotive vehicle equipped with the continuously variable transmission is suddenly accelerated from its low vehicle speed range by largely depressing an accelerator pedal, the continuously variable transmission has been changed into its condition in which the transmission ratio is larger. At this time, the primary pulley 1 rotates at a higher speed, while the secondary pulley 2 rotates at a lower speed upon inertia (for stopping the vehicle body) of a vehicle body being applied to the secondary pulley 2. Consequently, the steel elements 3b engaged in the V-shaped groove 8 of the primary pulley 1 are moved along the belt portion 3a to the side of the secondary pulley 2 thereby pushing the steel elements 3b engaged in the V-shaped groove 8 of the secondary pulley 2, in which the steel elements 3b moved from the primary pulley 1 are brought into tight contact with each other. As a result, relative sliding tends to occur between the steel elements 3b engaged in the V-shaped groove 8 of the primary pulley 1 and the sheave surfaces 5a, 7a of the primary pulley 1, without the steel elements 3b being moved to the side of the secondary pulley 1.

Here, the primary and secondary pulleys 1, 2 are formed to be same in surface roughness of the sheave surfaces 5a, 7a of the fixed wheel counterpart 5 and the movable wheel counterpart 7, as discussed above. If the surface roughness of the sheave surfaces 5a, 7a of the primary and secondary pulleys 1, 2 is higher (i.e., to make the sheave surfaces relatively rough), damage such as wear or breakaway of the surface portion tends to occur in the sheave surfaces 5a, 7a when relative slip is made between the steel elements 3b and the sheave surface 5a, 7a on the side of the primary pulley 1 as discussed above. This is problematic from the viewpoints of the durability of the primary pulley 1.

On the contrary, it may be proposed that the surface roughness of the sheave surfaces 5a, 7a of the primary and secondary pulleys 1, 2 is lower (i.e., to make the sheave surfaces relatively smooth). In this case, unnecessary processing has been made onto the side of the secondary pulley 2 because relative sliding does not occur between the steel elements 3b and the sheave surfaces 5a, 7a on the secondary pulley 2. In this connection, the sheave surfaces 5a, 7a are usually formed by being ground with a grinder. Consequently, in case that grinding is made onto both the primary and secondary pulleys 1, 2, life of the grinder will be shortened so as to be problematic from the viewpoint of production cost.

Figure 1:
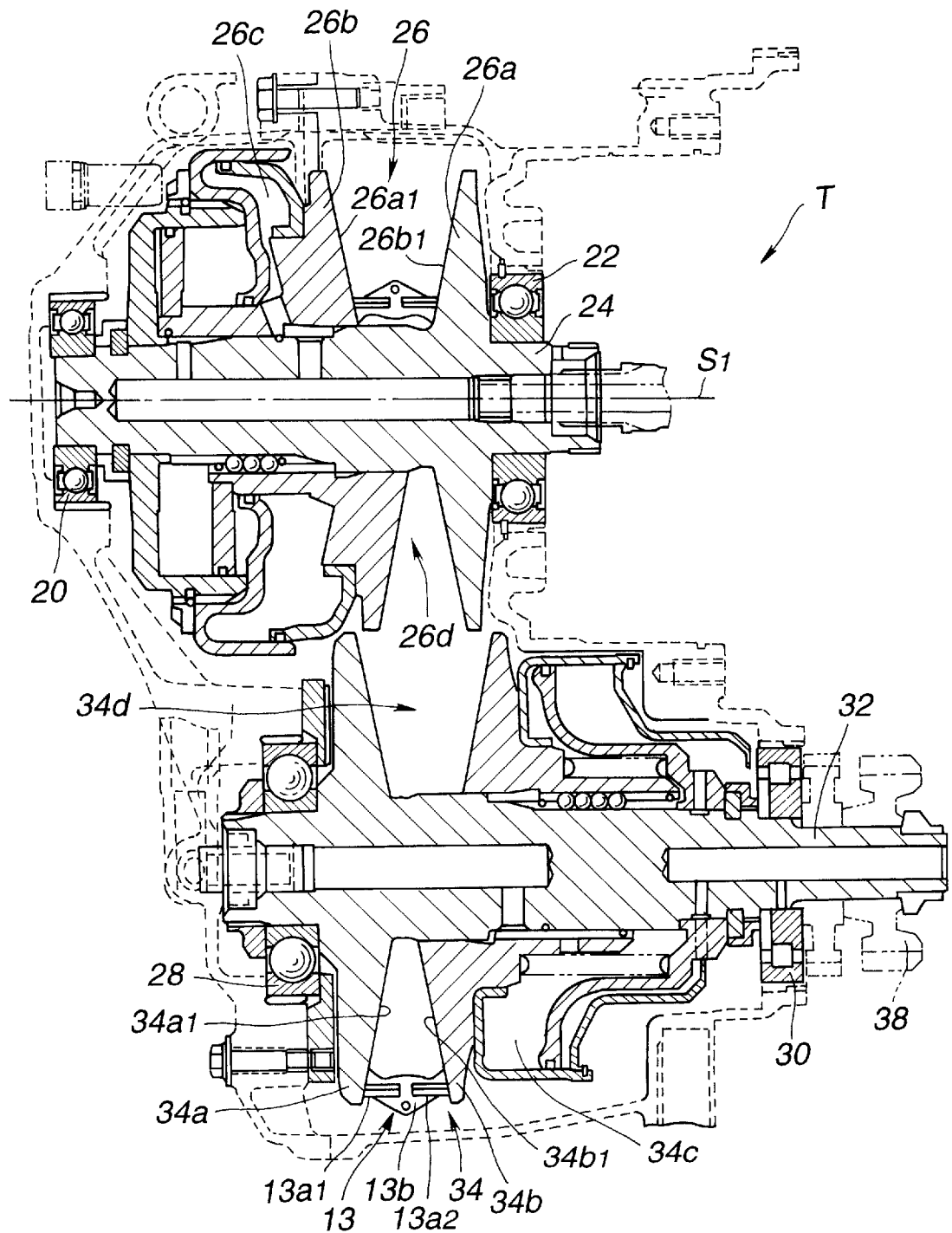
FIG. 1 is a vertical sectional view of an embodiment of a continuously variable transmission forming part of a transaxle, according to the present invention.

In view of the above description of the conventional continuously variable transmission, reference is now made to FIG. 1, wherein an embodiment of the continuously variable transmission (CVT) according to the present invention is illustrated by the reference character T. The continuously variable transmission T is housed in a transaxle of an automotive vehicle and comprises a primary pulley 26 which is disposed on a power input shaft 24. The power input shaft 24 is rotatably supported through bearings 20, 22 on a housing (shown in phantom) of the transaxle. A secondary pulley 34 is mounted on a power output shaft 32 which extends parallel with the power input shaft 24. An endless or loop-shaped belt 13 is wound or passed on the primary pulley 26 and the secondary pulley 34 to drivably connect the secondary pulley 34 with the primary pulley 26.

A rotational driving force is transmitted to the power input shaft 24 from an internal combustion engine through a torque converter and a forward and rearward cruising-changeover device for changing over a cruising direction of the vehicle between forward cruising and rearward cruising, though not shown. The rotational driving force transmitted to the power input shaft 24 is then transmitted to the power output shaft 32 through the primary pulley 26, the belt 13, and the secondary pulley 34. The rotational driving force transmitted to the power output shaft 32 is further transmitted through transmission gears such as driving gears 38 and idler gear to a differential, and then transmitted at a predetermined transmission ratio to right and left drive shafts, though not shown.

The primary pulley 26 includes a fixed wheel counterpart 26a, and a movable wheel counterpart 26b. The fixed wheel counterpart 26a is formed integral with the power input shaft 24. The movable wheel counterpart 26b is mounted on the power input shaft 24 in such a manner to be movable along the direction of an axis S1 of the power input shaft 24. A primary cylinder chamber 26c is formed at the rear side of the movable wheel counterpart 26b which rear side does not face the fixed wheel counterpart 26a. The primary cylinder chamber 26c is supplied with a hydraulic fluid to apply a hydraulic pressure to the movable wheel counterpart 26b so that the movable wheel counterpart 26b is movable toward the fixed wheel counterpart 26a. The fixed and movable wheel counterparts 26a, 26b are respectively formed with generally frustoconical sheave surface 26a1, 26b1, which face each other to form a pulley groove 26d having a generally V-shaped cross-section. It will be understood that the width of the pulley groove 26d is changeable with the axial movement of the movable wheel counterpart 26b.

The secondary pulley 34 includes a fixed wheel counterpart 34a, and a movable wheel counterpart 34b. The fixed wheel counterpart 34a is formed integral with the power output shaft 32. The movable wheel counterpart 34b is mounted on the power output shaft 32 in such a manner to be movable along the direction of an axis S2 of the power output shaft 32. A secondary cylinder chamber 34c is formed at the rear side of the movable wheel counterpart 34b which rear side does not face the fixed wheel counterpart 34a. The secondary cylinder chamber 34c is supplied with the hydraulic fluid to apply a hydraulic pressure to the movable wheel counterpart 34b so that the movable wheel counterpart 34b is movable toward the fixed wheel counterpart 34a. The fixed and movable wheel counterparts 34a, 34b are respectively formed with generally frustoconical sheave surface 34a1, 34b1 which face each other to form a pulley groove 34d having a generally V-shaped cross-section. It will be understood that the width of the pulley groove 34d is changeable with the axial movement of the movable wheel counterpart 34b.

The belt 13 is similar in construction to that 3 shown in FIG. 2 and includes two endless steel belt portions or cylindrical rings 13a1, 13a2 each of which is formed by laminating a plurality of endless steel sheets. A plurality of plate-shaped steel elements 13b are supported on the belt portions 13a1, 13a2 in a manner to be aligned along the periphery of the belt portions so that the adjacent ones are contactable with each other. Each steel element 13b has two opposite inclined end faces (not identified) which are respectively formed at the axially opposite ends of the element 13b relative to the pulley. The opposite inclined end faces of each steel element 13b are to be brought into contact with the frustoconical sheave surfaces 26a1, 26b1 of the wheel counterparts 26a, 26b of the primary pulley 26. Similarly, the opposite inclined end faces of each steel element 13b are to be brought into contact with the frustoconical sheave surfaces 34a1, 34b1 of the wheel counterparts 34a, 34b of the secondary pulley 34. Thus, the steel elements 13b are in engagement with the generally V-shaped grooves 26d, 34d of the primary and secondary pulleys 26, 34.

Here, the sheave surfaces 26a1, 26b1 of the fixed and movable wheel counterparts 26a, 26b are formed to have a relatively low surface roughness or are relatively smooth. On the contrary, the sheave surfaces 34a1, 34b1 of the fixed and movable wheel counterparts 34a1, 34b1 of the secondary pulley 34 are formed to have a relatively high surface roughness or to be relatively rough. In other words, the sheave surfaces 34a1, 34b1 of the secondary pulley 34 are rougher than the sheave surfaces 26a1, 26b1 of the primary pulley 26. More specifically, the surface roughness of the sheave surfaces 34a1, 34b1 of the secondary pulley 34 is higher or rougher than that of the sheave surfaces 26a1, 26b1 of the primary pulley 26. It is preferable that the surface roughness of the sheave surfaces 26a1, 26b1 of the primary pulley 26 is not higher or not rougher than Ra 0.4, and the surface roughness of the sheave surfaces 34a1, 34b1 of the secondary pulley 34 is within a range of from Ra 0.4 to Ra 1.6. This surface roughness is measured according to JIS (Japanese Industrial Standard) B0601.

Operation of the above continuously variable transmission T will be discussed.

When the automotive vehicle equipped with the continuously variable transmission T is suddenly accelerated from its low vehicle speed range by largely depressing an accelerator pedal, the continuously variable transmission T is changed into its condition in which a transmission ratio (revolution speed of the primary pulley/revolution speed of the secondary pulley) is larger. At this time, the width of the V-shaped groove 26d of the primary pulley 26 is increased thereby decreasing an effective radius (a radius at which the belt 13 is passed or wound on the pulley) of the belt 13, while the width of the V-shaped groove 34d of the secondary pulley 34 is decreased thereby increasing the effective radius of the belt 13. As a result, the primary pulley 26 rotates at a higher speed, while the secondary pulley 34 rotates at a lower speed upon inertia (for stopping the vehicle body) of a vehicle body being applied to the secondary pulley 34. Consequently, the steel elements 13b engaged in the V-shaped groove 26d of the primary pulley 26 are moved along the belt portion 13a to the side of the secondary pulley 34 thereby pushing the steel elements 13b engaged in the V-shaped groove 34d of the secondary pulley 34, in which the steel elements 13b moved from the primary pulley 26 are brought into contact with each other on the secondary pulley 34.

As a result, there is the possibility that relative sliding tends to occur between the steel elements 13b engaged in the V-shaped groove 26d of the primary pulley 26 and the sheave surfaces 26a1, 26b1 of the primary pulley 26, without the steel elements 13*b* being moved to the side of the secondary pulley 2. However, according to this continuously variable transmission T, the sheave surfaces 26*a*1, 26*b*1 of the primary pulley 26 are formed to have the relatively low surface roughness or to be relatively smooth, -and therefore friction coefficient of the sheave surfaces 26*a*1, 26*b*1 of the primary pulley 26 relative to the steel elements 3*b* is relatively low even if the relative sliding occurs. Consequently, there is no possibility of damage such as wear and breakaway of the surface portion occurring in the sheave surfaces 26*a*1, 26*b*1 of the primary pulley 26, thereby improving durability of the primary pulley 26.

Additionally, the sheave surfaces 34*a*1, 34*b*1 (no sliding occurs between them and the steel element 3*b*) of the secondary pulley 34 are formed to have the relatively high surface roughness or to be relatively rough. Accordingly, in a process for grinding the sheave surfaces 26*a*1, 26*b*1 of the primary pulley 26 and the sheave surfaces 34*a*1, 34*b*1 of the secondary pulley 34, a large amount of grinding is not required for the sheave surfaces 34*a*1, 34*b*1 of the secondary pulley 34, thus improving life of a grinder while lowering production cost of the continuously variable transmission T.

It will be appreciated that the sheave surfaces 34*a*1, 34*b*1 of the secondary pulley 34 may be formed to have a relatively low surface roughness or to be relatively smooth like the sheave surfaces 26*a*1, 26*a*2 of the primary pulley 26, which will provide no functional problem. It is sufficient that the surface roughness of the sheave surfaces 34*a*1, 34*b*1 is within a range whose upper (rougher) limit is higher (rougher) than the surface roughness of the sheave surfaces 26*a*1, 26*b*1 of the primary pulley 26.

What is claimed is:

1. A continuously variable transmission comprising:

a primary pulley disposed on a power input shaft, said primary pulley including a fixed wheel counterpart which is fixed to said power input shaft and has a first sheave surface coaxial with said power input shaft, and a movable wheel counterpart which is movable in a direction of axis of said power input shaft and has a second sheave surface coaxial with said power input shaft, said second sheave surface facing said first sheave surface to form a first pulley groove, the width of the primary pulley being changeable with movement of said movable wheel counterpart;

a secondary pulley disposed on a power output shaft, said secondary pulley includes a fixed wheel counterpart which is fixed to said power output shaft and has a third sheave surface coaxial with said power output shaft, and movable wheel counterpart which is movable in a direction of axis of said power output shaft and has a fourth sheave surface coaxial with said power output shaft, said fourth sheave surface facing said third sheave surface to form a second pulley groove, the width of the secondary pulley being changeable with movement to said movable pulley; and an endless belt wound on said primary pulley and said secondary pulley so that said secondary pulley is drivable connected to said primary pulley, an effective radius of said belt wound on each of said primary and secondary pulleys being changeable with a transmission ratio, said belt including a steel belt portion, and a plurality of steel elements supported on said steel belt portion and aligned along the steel belt portion, each steel element being engaged in said first pulley groove of said primary pulley and in said second pulley groove of said secondary pulley so as to be locatable between and contactable with the first and second sheave surfaces of the primary pulley and the third and fourth sheave surfaces of said secondary pulley, respectively;

wherein the first and second sheave surfaces of said fixed and movable wheel counterparts of said primary pulley have a first surface roughness, and the third and fourth sheave surfaces of said fixed and movable wheel counterparts of said secondary pulley have a second surface roughness which is higher than said first surface roughness.

2. A continuously variable transmissions as claimed in claim 1, wherein an upper limit of a range of said second surface roughness is higher than said first surface roughness.

3. A continuously variable transmission as claimed in claim 1, wherein said first surface roughness is within the range of not higher then Ra 0.4, and said second surface roughness is within a range of from Ra 0.4 to Ra 1.6.

4. A continuously variable transmission as claimed in claim 1, wherein said first surface roughness of the first and second sheave surfaces of the fixed and movable wheel counterparts of said first pulley is within a first range, and said second surface roughness of the third and fourth sheave surfaces of said fixed and movable wheel counterparts of said second pulley is within a second range, said second range being higher than said first range.

5. A continuously variable transmission as claimed in claim 1, wherein the first and second sheave surfaces of said fixed and movable wheel counterparts of said first pulley are smoother than the third and fourth sheave surfaces of said fixed and movable wheel counterparts of said secondary pulley.

* * * * *